United States Patent
Lin et al.

(10) Patent No.: US 9,003,886 B2
(45) Date of Patent: Apr. 14, 2015

(54) MICROELECTROMECHANICAL SYSTEMS DEVICES AND METHODS FOR THE FABRICATION THEREOF

(75) Inventors: Yizhen Lin, Niskayuna, NY (US); Sung Jin Jo, Gilbert, AZ (US); Lisa Z. Zhang, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 295 days.

(21) Appl. No.: 13/458,950

(22) Filed: Apr. 27, 2012

(65) Prior Publication Data

US 2013/0283913 A1    Oct. 31, 2013

(51) Int. Cl.
*G01P 15/125*     (2006.01)
*G01C 19/56*     (2012.01)
*G01P 15/08*     (2006.01)

(52) U.S. Cl.
CPC .......... *G01P 15/0802* (2013.01); *G01P 15/125* (2013.01); *G01P 2015/0814* (2013.01); *Y10T 29/49002* (2015.01)

(58) Field of Classification Search
CPC ... G01P 15/125; G01P 15/0802; G01P 15/18; G01P 15/131; G01P 15/123; G01C 19/56; G01C 19/5719; G01C 19/5642; G01C 19/5663; G01C 19/5635
USPC .............. 73/514.32, 514.36, 514.38, 504.14, 73/504.04, 504.12
See application file for complete search history.

(56) References Cited

U.S. PATENT DOCUMENTS

| | | | | |
|---|---|---|---|---|
| 7,258,012 | B2 | 8/2007 | Xie | |
| 7,810,394 | B2* | 10/2010 | Yazdi | 73/514.18 |
| 7,886,601 | B2* | 2/2011 | Merassi et al. | 73/514.32 |
| 8,443,671 | B2* | 5/2013 | Classen et al. | 73/514.32 |
| 8,610,222 | B2* | 12/2013 | Lin et al. | 257/414 |
| 8,689,632 | B2* | 4/2014 | Jia et al. | 73/504.12 |
| 8,689,633 | B2* | 4/2014 | Classen | 73/514.32 |
| 2011/0174074 | A1* | 7/2011 | Li et al. | 73/504.14 |

OTHER PUBLICATIONS

Xie, J., et al, "Compact Electrode Design for In-Plane Accelerometer on SOI With Refilled Isolation Trench," Transducers '11; Jun. 5-9, 2011.

* cited by examiner

*Primary Examiner* — Helen Kwok
(74) *Attorney, Agent, or Firm* — Ingrassia Fisher & Lorenz, P.C.

(57) ABSTRACT

Embodiments of compact micro-electro-mechanical systems (MEMS) devices are provided, as are embodiments of methods for fabricating MEMS devices. In one embodiment, the MEMS device includes a substrate, a movable structure resiliently coupled to the substrate, and an anchored structure fixedly coupled to the substrate. The movable structure includes a first plurality of movable fingers, and a second plurality of movable fingers electrically isolated from and interspersed with the first plurality of movable fingers. The anchored structure includes fixed fingers interspersed with first and second pluralities of movable fingers in a capacitor-forming relationship. First and second interconnects are electrically coupled to the first and second pluralities of movable fingers, respectively.

17 Claims, 5 Drawing Sheets

MICROELECTROMECHANICAL SYSTEMS DEVICES AND METHODS FOR THE FABRICATION THEREOF

TECHNICAL FIELD

Embodiments of the present invention relate generally to microelectromechanical systems ("MEMS") devices.

BACKGROUND

Microelectromechanical systems ("MEMS") devices are employed as actuators, switches, and sensors (e.g., gyroscopes and accelerometers) in a wide variety of applications. Capacitive-sensing MEMS devices, for example, are now commonly employed in many different electronic devices to sense acceleration, vibration, device orientation, and other inertia-related parameters. Such MEMS devices function by sensing changes in capacitance between a number of stationary electrodes interposed with and spaced apart from a number of movable electrodes in, for example, a comb-type arrangement. The movable electrodes are rigidly joined to a larger movable structure commonly referred to as a "proof mass," which is resiliently suspended over an underlying substrate. In one example, a voltage differential is applied across the stationary or movable electrodes. As the proof structure moves in response to acceleration of the MEMS device, the movable electrodes are displaced with respect to the fixed electrodes and the capacitances between the electrodes vary accordingly. By monitoring these capacitances, the acceleration or other movement of the MEMS device can be determined.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Any implementation described herein as exemplary is not necessarily to be construed as preferred or advantageous over other implementations. Furthermore, there is no intention to be bound by any theory presented in the preceding Background or the following Detailed Description.

For simplicity and clarity of illustration, the drawing figures illustrate the general manner of construction, and descriptions and details of well-known features and techniques may be omitted to avoid unnecessarily obscuring the invention. Additionally, elements in the drawings figures are not necessarily drawn to scale. For example, the dimensions of some of the elements or regions in the figures may be exaggerated relative to other elements or regions to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements, but may include other elements not expressly listed or inherent to such process, method, article, or apparatus. The term "coupled," as used herein, is defined as directly or indirectly connected in an electrical or non-electrical manner. As used herein the terms "substantial" and "substantially" mean sufficient to accomplish the stated purpose in a practical manner and that minor imperfections, if any, are not significant for the stated purpose.

It is desirable to provide MEMS accelerometers and other capacitive-sensing MEMS devices having reduced sizes, lower production costs, and improved measures of performance, such as relatively high signal-to-noise ratios. It is also desirable to provide MEMS devices having relatively low Temperature Coefficient of Offsets ("TCOs"); that is, MEMS devices capable of maintaining relatively high output performance despite stresses induced by differences in coefficients of thermal expansion between disparate materials utilized in fabrication of the MEMS device. Similarly, it is desirable for such MEMS devices to be relatively insensitive to mechanical stresses arising from packaging constraints as may arise from, for example, soldering of the packaged MEMS device to a printed circuit board. In satisfaction of many, if not all, of these criteria, embodiments of a highly compact MEMS device are provided herein having, for example, a sensing cell pitch equal to or less than about 9 microns (μm) in width. Advantageously, embodiments of the MEMS device described herein employ a fully-differentiated, whole-bridge capacitive topology to achieve improved signal gains and relatively high signal-to-noise ratios. Additionally, in certain embodiments, the MEMS devices described herein are characterized by a unique, centrally-anchored design, which mechanically isolates the sensing structure from mechanical stresses imparted to the underlying substrate due to differences in coefficients in thermal expansion and/or packaging constraints of the type described above. The result is a highly compact, highly sensitive MEMS device having excellent TCO performance characteristics.

Figure 1:
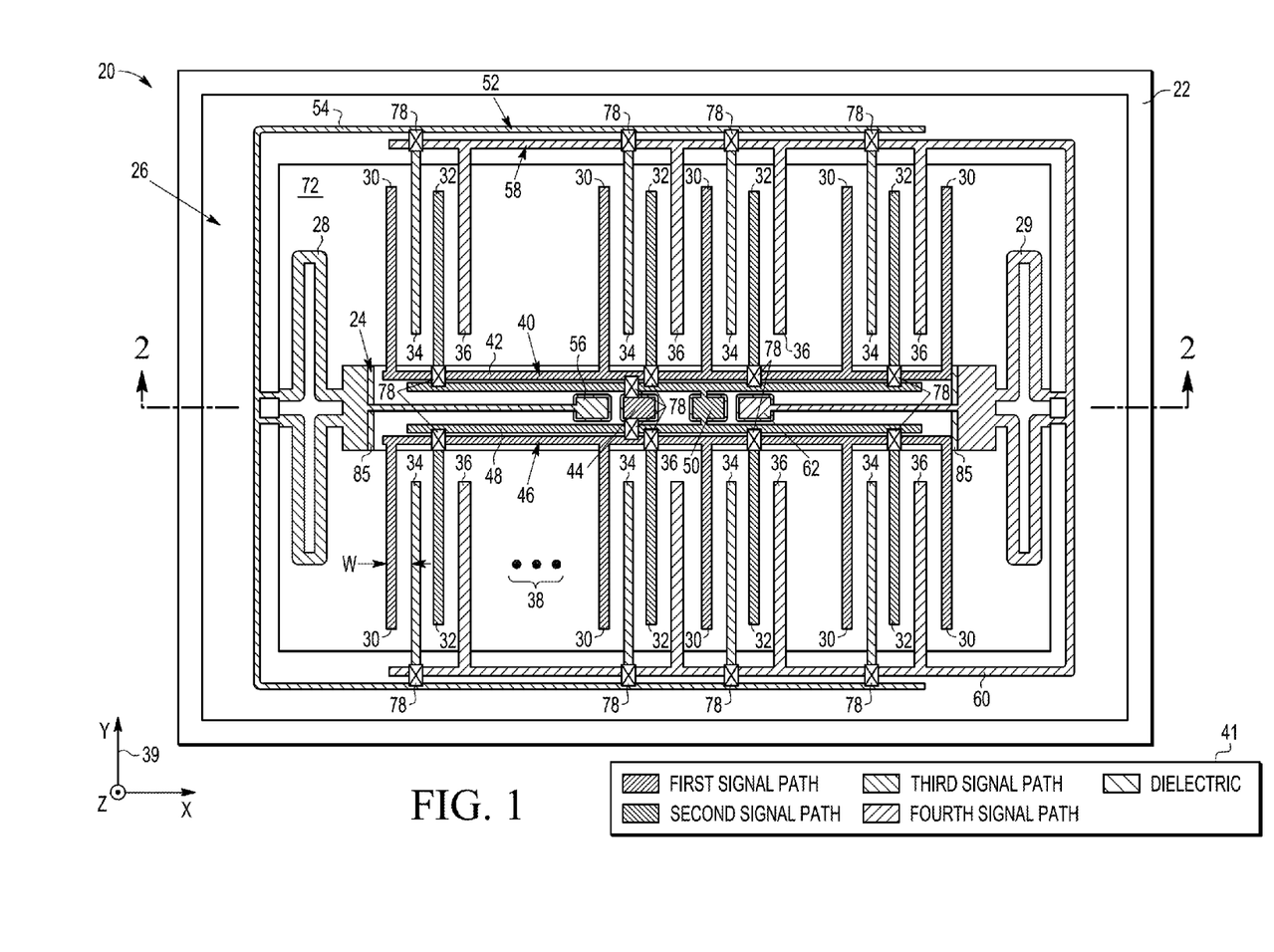
FIG. 1 illustrates, in a schematic top down view, a compact, full differential, stress-isolated MEMS device, as illustrated in accordance with an exemplary embodiment of the present invention.

FIG. 1 is a simplified schematic of a MEMS device 20 illustrated in accordance with an exemplary and non-limiting embodiment of the present invention. MEMS device 20 is well-suited for usage as an accelerometer and will consequently be described below as "MEMS accelerometer 20." It is, however, emphasized that embodiments of the capacitive-sensing MEMS devices described herein are by no means limited to implementation as accelerometers and can also be utilized to monitor other inertia-related parameters, such as device orientation, displacement, and vibration. Furthermore, in a broader sense, the isolation and interconnect schemes described herein can be applied to MEMS actuator with appropriate design modifications to produce a capacitive actuation structure, as well as to other types of MEMS sensors, such as gyroscopes. While is illustrated as a single axis accelerometer in FIG. 1, it will be appreciated that MEMS device 20 can be fabricated as a multi-axis device in alternative embodiments or can be combined with similar MEMS devices to yield a multi-axis sensor system.

MEMS accelerometer 20 includes a substrate 22, an anchored structure 24 formed over substrate 22, and a movable structure 26 formed over substrate 22 proximate anchored structure 24. Substrate 22 can be any body of material over which movable structure 26 and anchored structure 24 can be fabricated, such as a silicon, glass, or quartz wafer. The body of anchored structure 24 is rigidly affixed to underlying substrate 22 such that relative movement between anchored structure 24 and substrate 22 is prevented. Consequently, anchored structure 24 is essentially immovable or spatially fixed with respect to substrate 22. In contrast, the body of movable structure 26 is resiliently coupled to underlying substrate 22 and moves with respect to both substrate 22 and anchored structure 24 in response to acceleration or other movement of MEMS accelerometer 20. Movable structure 26 can be mechanically coupled to underlying substrate 22 in any manner that enables displacement of movable structure 26 relative to substrate 22 and anchored structure 24. In certain embodiments, movable structure 26 may be directly connected to substrate 22 via one or more spring members, which are compliant in the axis or axes along which accelerometer 20 senses acceleration. Alternatively, movable structure 26 may be joined by one or more springs members to anchored structure 24, which is, in turn, joined to substrate 22. For example, in the embodiment illustrated in FIG. 1, opposing ends of movable structure 26 are joined to anchored structure 24 by way of first and second spring members 28 and 29. In this exemplary case wherein MEMS accelerometer 20 is a single axis device, spring members 28 and 29 are fabricated to be compliant along the sense axis (identified as the X-axis in FIG. 1), while being relatively stiff along the axes orthogonal to the sense axis (identified as the Y- and Z-axes in FIG. 1).

MEMS accelerometer 20 further includes a number of sense electrodes or fingers 30, 32, 34, and 36, which are interposed in a laterally-spaced arrangement, as described more fully below. The term "finger" is utilized herein to indicate that electrodes 30, 32, 34, and 36 will often assume the form of elongated, beam-like plates or structures; however, the term "finger" is defined to include any electrically-conductive structure or electrode, which can be interspersed with or otherwise positioned in a capacitor-forming relationship with other electrically-conductive structures to produce a capacitive-sensing MEMS device of the type described herein. Sense fingers 30 and 32 extend outwardly from anchored structure 24 from opposing sides of structure 24 along substantially parallel axes, which are substantially perpendicular to the sense axis (again, identified as the x-axis in FIG. 1) and generally reside within a single plane that is co-planar with the upper surface of substrate 22. Fingers 30 and 32 are spatially fixed with respect to structure 24 and underlying substrate 22; consequently, sense fingers 30 and 32 are referred to herein as "fixed fingers 30, 32."

Sense fingers 34 and 36 are affixed to and extend from movable structure 26. More specifically, sense fingers 34 and 36 extend inwardly from opposing inner peripheral edges of movable structure 26 toward anchored structure 24. Sense fingers 34 and 36 extend long substantially parallel axes, which are substantially perpendicular to the sense axis and generally reside within the same plane as do fixed fingers 30 and 32. In contrast to fixed fingers 30 and 32, sense fingers 34 and 36 move in response to acceleration of MEMS accelerometer 20 in conjunction with movable structure 26. For this reason, sense fingers 34 and 36 are referred to herein as "movable fingers 34, 36." Fixed fingers 30, 32 and movable fingers 34, 36 are interspersed or interposed in a capacitor-forming relationship. In the exemplary embodiment illustrated in FIG. 1, specifically, fixed fingers 30, 32 are interleaved with movable fingers 34, 36 in an alternating or comb-type arrangement such that each fixed finger 30, 32 is positioned between two neighboring movable fingers 34, 36 and laterally separated therefrom by an air gap. Although illustrated as including a certain number of fingers 30, 32, 34, and 36 in FIG. 1, it will be appreciated that MEMS accelerometer 20 can be fabricated to include a greater or a lesser number of fingers in further embodiments, as indicated in FIG. 1 by ellipses 38.

As noted above, MEMS accelerometer 20 is fabricated such that laterally-adjacent pairs of fingers 30, 32, 34, and 36 are separated by an air gap. As indicated in FIG. 1 by convergent arrows 39, the lateral gap between neighboring fingers 34 and 36 has a predetermined width "W." In one embodiment, the predetermined width "W" may be less than about 5 µm and, perhaps, equal to about 2 µm. The lateral width of each of fingers 30, 32, 34, and 36, as taken along the X-axis in FIG. 1, may likewise be less than about 5 µm or, more specifically, equivalent to about 2 µm. The thickness or height of each of fingers 30, 32, 34, and 36, as taken along the Z-axis in FIG. 1 and as generally determined by the thickness of structural layer 64 (described below in conjunction with FIG. 2), may be between about two and fifty µm and, perhaps, equal to about twenty five µm. Fingers 30, 32, 34, and 36 are advantageously fabricated to have a high aspect ratio; e.g., in one embodiment, the finger height-to-width ratio may be about 12:1. Such a high aspect ratio provides an increase in surface area between fingers 30, 32, 34, and 36 and, therefore, a larger sense capacitance and an increased signal-to-noise ratio. The body of movable structure 26 is also advantageously fabricated to have such a high aspect ratio to provide a relatively large mass and moment of inertia to reduce thermal noise. The foregoing notwithstanding, it is emphasized that the particular dimensions and geometries of fingers 30, 32, 34, and 36 will inevitably vary amongst different embodiments of MEMS accelerometer 20, as will the dimensions and geometries of the other structural features included within accelerometer 20.

Fixed fingers 30, 32 are divided into two electrically-isolated sub-groupings or sets, namely, a first plurality of fixed fingers 30 (referred to herein as "$X_1$ fingers 30") and a second plurality of fixed fingers 32 (referred to herein as "$X_2$ fingers 32"). $X_1$ fingers 30 are electrically interconnected by an $X_1$ interconnect 40, which is graphically identified by a first pattern identified in legend 41 appearing in the lower right hand corner of FIG. 1. In the illustrated example, $X_1$ interconnect 40 includes an $X_1$ interconnect line 42 and an $X_1$ via 44, the term "via," as appearing herein, denoting an electrically-conductive element, such as a metal plug formed through one or more dielectric layers, electrically coupling electrical conductors formed on different levels of a MEMS device. $X_1$ interconnect line 42 is formed over the upper surface of anchored structure 24 as, for example, a metal trace. $X_1$ via 42 is formed through the body of anchored structure 24 and extends to underlying substrate 22. Similarly, $X_2$ fingers 32 are electrically interconnected by an $X_2$ interconnect 46 (represented in FIG. 1 by a second pattern, as identified in legend 41, which includes an $X_2$ interconnect line 48 and an $X_2$ via 50. $X_2$ interconnect line 48 is formed over the upper surface of anchored structure 24 as a second trace, and $X_2$ via 50 is formed through the body of anchored structure 24. $X_1$ and $X_2$ interconnects 40 and 46 are further electrically connected to first and second device terminals, respectively, included within MEMS accelerometer 20 and not shown in FIG. 1 for clarity.

As are fixed fingers 30, 32, movable fingers 34, 36 are likewise divided into two electrically-isolated sub-groupings: (i) a first plurality of movable fingers 34 (referred to herein as "$M_1$ fingers 34"), and (ii) a second plurality of movable fingers 36 (referred to herein as "$M_2$ fingers 36"). $M_1$ fingers 30 are electrically interconnected by an $M_1$ interconnect 52, which are graphically represented in FIG. 1 by a third pattern identified in legend 41. $M_1$ interconnect 52 includes an $M_1$ interconnect line 54 and an $M_1$ via 56. $M_1$ interconnect line 54 is formed over the upper surfaces of both movable structure 26 and anchored structure 24; e.g., $M_1$ interconnect line 48 may include a first trace formed over movable structure 26, and a second trace formed over anchored structure 24. An intermediate segment of $M_1$ interconnect line 54 extends across spring structure 28 to electrically connect the portion of $M_1$ interconnect line 54 formed over movable structure 26 with the portion of line 54 formed over anchored structure 24. To this end, the intermediate portion of interconnect line 54 may be formed over spring structure 28 as an overlying conductive layer, in which case an intervening dielectric layer may be formed between the intermediate portion of interconnect line 52 and spring structure 28 should spring structure 28 be fabricated from an electrically-conducive material. Alternatively, in embodiments wherein spring structure 28 is fabricated from a metal or other electrically-conductive material, spring structure 28 may itself form part of interconnect line $M_1$. As do $X_1$ via 44 and $X_2$ via 50, $M_1$ via 56 extends through the body of anchored structure 24 to underlying substrate 22 and is electrically coupled to a device terminal provided thereon (not shown in FIG. 1 for clarity).

$M_2$ fingers 32 are electrically interconnected by an $M_2$ interconnect 58 (represented by a fourth pattern identified in legend 41), which includes an $M_2$ interconnect line 60 and an $M_2$ via 62. As is $M_1$ interconnect line 54, $M_2$ interconnect line 60 is formed over the upper surface of movable structure 26 in addition to the upper surface of anchored structure 24. Furthermore, $M_2$ interconnect line 60 extends across spring structure 29; e.g., as noted above, an intermediate portion of interconnect line 54 may either be formed over spring structure 29 as an overlying conductive layer or, in embodiments wherein spring structure 29 is fabricated from a metal or other conductive material, spring structure 29 may form part of interconnect line $M_2$. $M_2$ via 62 is formed through the body of anchored structure 24. $M_2$ interconnect 58, and specifically $M_2$ via 62, is further electrically coupled to a fourth device terminal (not shown) included within MEMS accelerometer 20.

Figure 2:
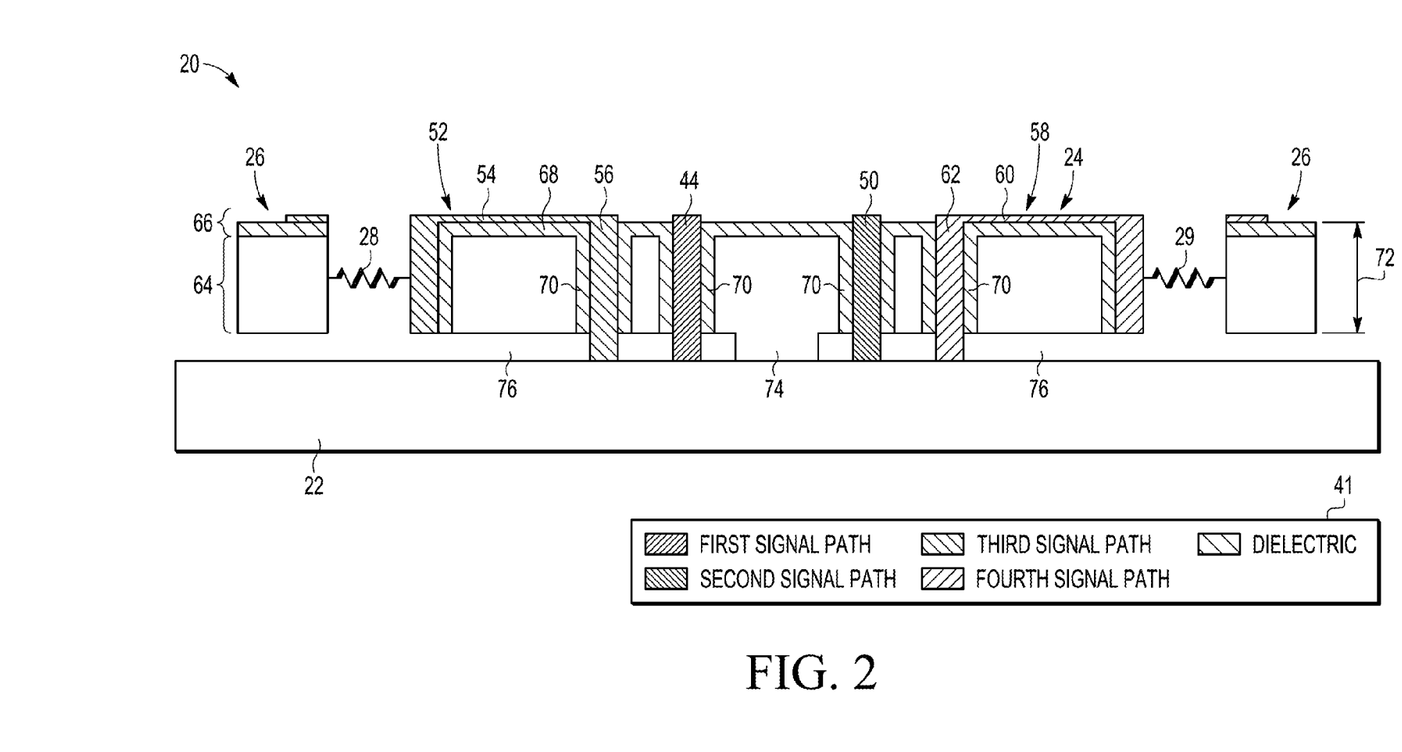
FIG. 2 is a cross-sectional view of the MEMS device shown in FIG. 1, as taken along line 2-2 (identified in FIG. 1)

Fingers 30, 32, 34, and 36, and $X_1$, $X_2$, $M_1$, and $M_2$ interconnects 42, 48, 54, and 60 can be fabricated from various different electronically-conductive materials including, but not limited to, polycrystalline silicon, single crystal silicon, and metals, such as copper. In certain embodiments, the body of movable structure 26 and the body of anchored structure 24 may likewise be formed from an electrically-conductive material, such as polycrystalline or single crystal silicon. In such embodiments, fingers 30, 32, 34, and 36, and $X_1$, $X_2$, $M_1$, and $M_2$ interconnects 42, 48, 54, and 60 may be electrically isolated from the electrically-conductive bodies of movable structure 26 and anchored structure 24 by one or more intervening dielectric layers. Further emphasizing this point, FIG. 2 illustrates MEMS accelerometer 20 in cross-section as taken along line 2-2 identified in FIG. 1. In the exemplary embodiment shown in FIG. 2, MEMS accelerometer 20 has been produced utilizing a so-called "MEMS process flow" wherein a structural layer 64 is first formed over substrate 22 followed by the formation of an interconnect layer 66. As can be seen in FIG. 2, a dielectric layer 68 has been formed over the upper surfaces of the bodies of movable structure 26 and anchored structure 24 between interconnect lines 42, 48, 54, and 60 (interconnect lines 42 and 48 identified in FIG. 1). In addition, a dielectric ring 70 has been formed around the conductor of each via 42, 46, 50, 54 to further electrically isolate $X_1$, $X_2$, $M_1$, and $M_2$ interconnects 42, 48, 54, and 60 (identified in FIG. 1) from the electrically-conductive body of anchored structure 24. Notably, when fabricated in this manner, MEMS accelerometer 20 includes a single metal level greatly simplifying device layout and reducing interline capacitance. These advantages notwithstanding, MEMS accelerometer 20 can be fabricated utilizing other manufacturing process flows, as well, including so-called "CMOS MEMS" processes similar to the processes utilized to fabricated transistors and other semiconductor devices.

In the exemplary embodiment illustrated in FIGS. 1 and 2, anchored structure 24 is centrally disposed on substrate 22 and circumscribed or surrounded by movable structure 26. More specifically, the body of anchored structure 24 is formed as an elongated bridge structure; and the body of movable structure 26 is fabricated as a rectangular frame, which extends around anchored structure 24 and which has a central opening 72 in which movable structure 26 is disposed. Furthermore, as may be appreciated most easily by referring to FIG. 2, anchored structure 24 is affixed or connected to underlying substrate 22 at a single, centralized attachment point 74, with the remainder of anchored structure 24 separated from the upper surface of substrate 22 by undercut areas 76. Vias 44, 50, 56, and 62 serve as electronically-conductive anchor elements, which extend through the body of anchored structure 24, across undercut areas 76, and to underlying substrate 22 to contact corresponding interconnects provided on substrate 22 (not shown). By locating the electrical and mechanical connections between the sensing structure and substrate 22 within close proximity to one another and at a centralized area of substrate 22, adverse effects caused inconsistencies and irregularities of strain across the plane of the substrate are reduced. As a result, such MEMS accelerometer 20 is less susceptible to thermally induced package stress gradients, and can be readily implemented as a low cost, compact, differential-sensing transducer. These advantages notwithstanding, embodiments of accelerometer 20 can assume other topologies in further embodiments, in which case movable structure 26 may or may not surround anchored structure 24; vias 44, 50, 56, and 62 may or may not be routed through a central portion of anchored structure 24; and anchored structure 24 may or may not be affixed to substrate 22 by way of a single, centralized attachment point.

Figure 3:
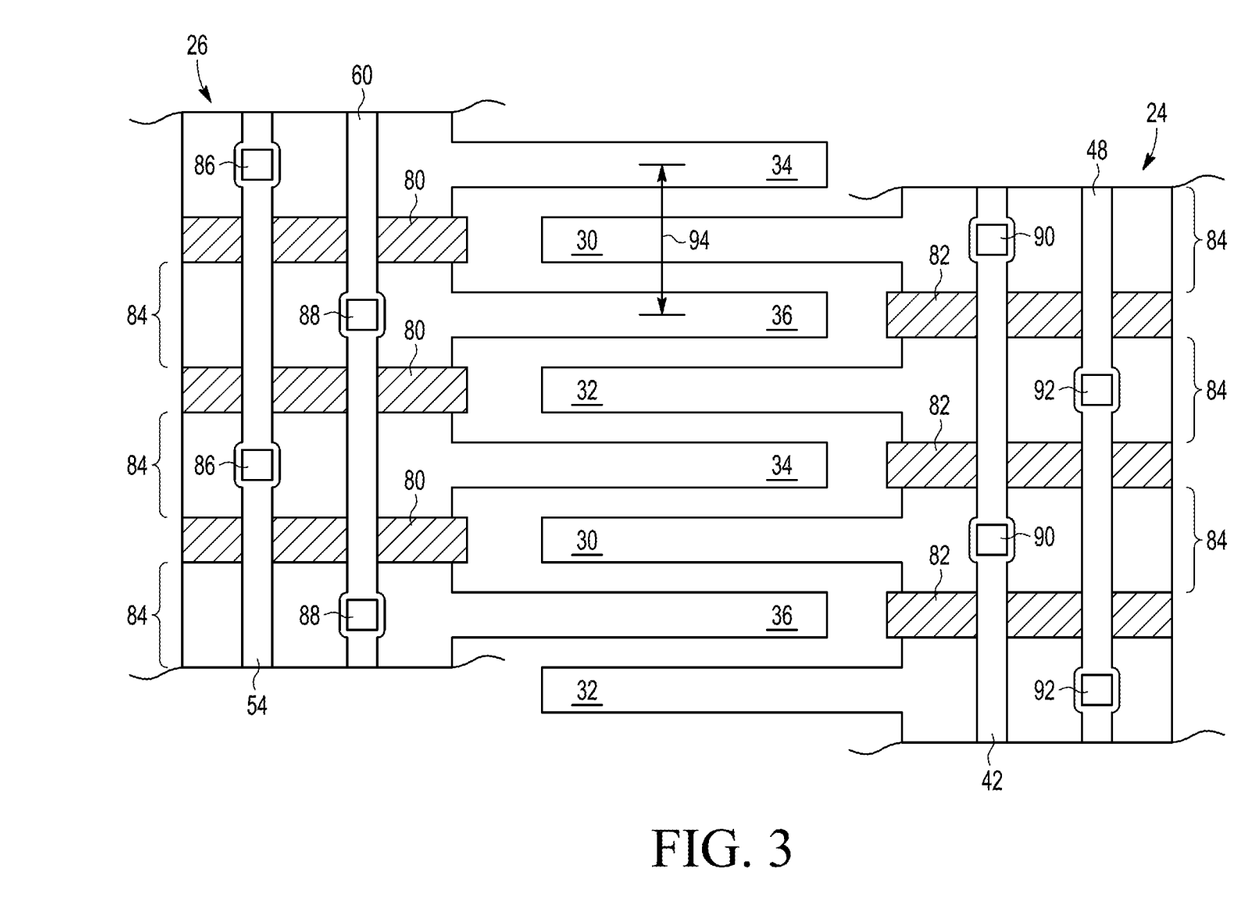
FIG. 3 is a top down view of a portion of the MEMS device shown in FIGS. 1 and 2 illustrating, in greater detail, the relative positioning of the fixed electrodes or fingers with respect to the movable electrodes or fingers.

Due to the interposition of fingers 30, 32, 34, and 36, and as generally indicated in FIG. 1 by box-shaped symbols 78, the $X_1$, $X_2$, $M_1$, and $M_2$ 42, 48, 54, and 60 interconnects cross at various locations over the upper surfaces of MEMS accelerometer 20. One manner in which electrical isolation of the $X_1$, $X_2$, $M_1$, and $M_2$ 42, 48, 54, and 60 interconnects can be maintained while providing such cross-over points is through the usage of a number of cross-over features of the type illustrated in FIGS. 3 and 4. Referring initially to FIG. 3, which is a top down view illustrating a portion of MEMS accelerometer 20 in greater detail, it can be seen that a first plurality of embedded electrical isolation features 80 are formed in the electrically-conductive body of movable structure 26, and a second plurality of embedded electrical isolation features 82 are formed in the body of anchored structure 24. As can be appreciated most readily in FIG. 4, which is an isometric view of a portion of movable structure 26, isolation features 80 extend entirely through the body of movable structure 24; that is, features 80 extend from the upper surface of movable structure 26 to the lower surface thereof. Embedded electrical isolation features 82 formed in anchored structure 24 likewise extend entirely through the thickness or body of structure 24. In so doing, isolation features 80 and 82 segregate the electrically-conductive bodies of movable structure 26 and anchored structure 24 into a number of electrically-isolated regions or sections 84. A different finger 30, 32, 34, or 36 extends from each electrically-isolated section 84.

Embedded electrical isolation features 80 are conveniently fabricated as dielectric-filled trenches. In this case, isolation features 80 may be formed by first etching trenches into the bodies of movable structure 26 and anchored structure 24 and subsequently depositing a chosen dielectric material, such as a nitride (e.g., silicon nitride) or an oxide (e.g., silicon oxide), into the trenches. Etching may be carried-out utilizing a conventionally-known lithographical patterning technique. The chosen dielectric material can be deposited into the etched trenches utilizing a chemical vapor deposition (CVD) technique. For example, when silicon oxide is deposited, a low temperature Plasma-Enhanced CVD or Low Pressure CVD may be performed utilizing silane ($SiH_4$) or tetraethylorthosilicate ($Si(OC_2H_5)_4$ or "TEOS") chemistries. As further shown in FIG. 1, embedded electrical isolation features 85 may likewise be formed between the inner ends of spring structures 28 and 29 and the electrically conductive body of anchored structure 24 to provide electrical separation therebetween.

Figure 4:
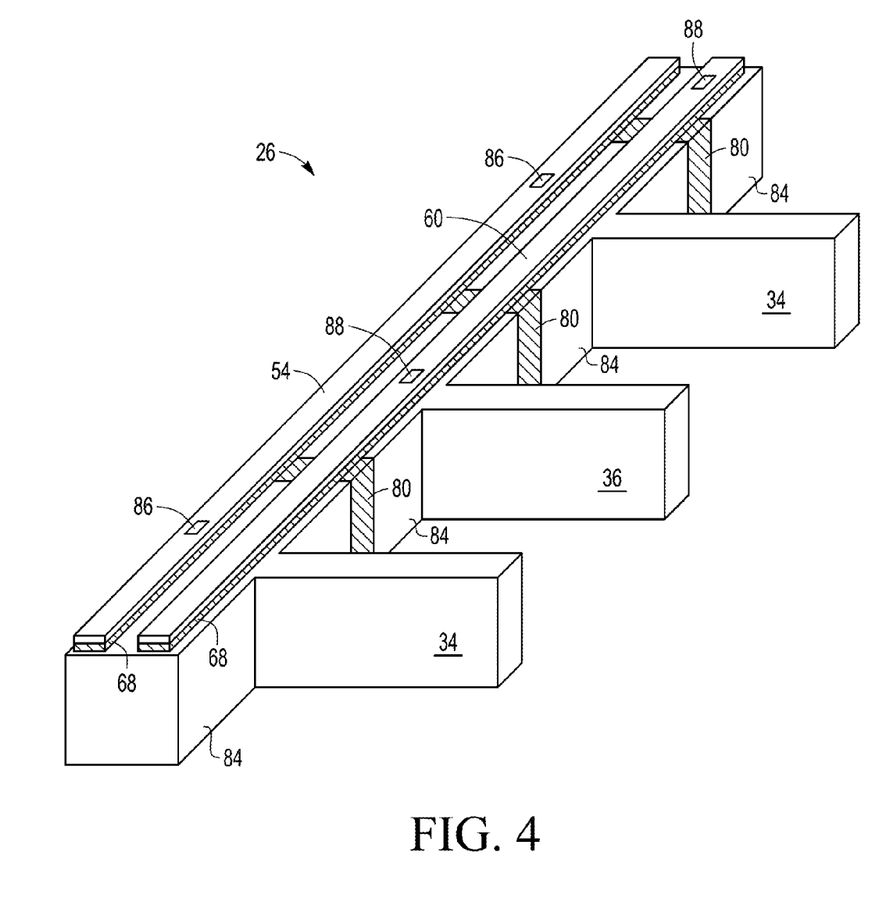
FIG. 4 is an isometric view illustrating the manner in which a plurality of cross-over features may be utilized to electrically isolate the interleaved fingers.

As described above in conjunction with FIG. 2, and as shown in greater detail in FIG. 4, $M_1$ and $M_2$ interconnect lines 54 and 60 are formed over the electrically-conductive body of movable structure 26 and electrically isolated therefrom by intervening dielectric layers 68. In a similar manner, the $X_1$ and $X_2$ interconnect lines 42 and 48 are formed over the electrically-conductive body of anchored structure 24 and separated therefrom by intervening dielectric layers 68 (FIG. 2). As generically illustrated in FIGS. 3 and 4, a number of vias 86, 88, 90, and 92 are formed through dielectric layers 68 to electrically couple interconnect lines 42, 48, 54, and 60, respectively, to different electrically-segregated regions 84 (FIG. 3) of the bodies of movable structure 26 and anchored structure 24 and thereby electrically interconnect fingers 30, 32, 34, and 36. More specifically, as shown in FIGS. 3 and 4, vias 86 are formed through the dielectric layer 68 underlying $M_1$ interconnect line 54 to electrically couple the electrically-isolated sections 84 of movable structure 26 from which $M_1$ fingers 34 extend and thereby electrically interconnect $M_1$ fingers 34. In this manner, MEMS accelerometer 20 is fabricated to include a number of cross-over features electrically coupling $M_1$ interconnect line 54 (and more generally $M_1$ interconnect 52) to $M_1$ fingers 34, while electrically isolating $M_1$ interconnect line 54 and $M_1$ fingers 34 from $M_2$ interconnect line 60 and $M_2$ fingers 36. As further shown in FIGS. 3 and 4, vias 86 are also formed through the dielectric layer 68 underlying $M_2$ interconnect line 60 to electrically couple the electrically-isolated sections 84 of movable structure 26 from which $M_2$ fingers 36 extend and thereby electrically interconnect $M_2$ fingers 36, while providing electrical isolation from $M_1$ fingers 34 and $M_1$ interconnect line 54. Similarly, as indicated in FIG. 3, vias 86 are further formed through the dielectric layer 68 (FIG. 2) underlying $X_1$ interconnect line 42 to electrically couple the electrically-isolated sections 84 of anchored structure 24 from which $X_1$ fingers 30 extend and electrically interconnect $X_1$ fingers 30, while providing electrical isolation from $X_2$ fingers 32 and $X_2$ interconnect line 48. Finally, vias 86 are formed through the dielectric layer underlying $X_2$ interconnect line 48 to electrically couple the electrically-isolated sections 84 of anchored structure 24 from which $X_2$ fingers 32 extend and electrically interconnect $X_2$ fingers 32, while providing electrical isolation from $X_1$ fingers 30 and $X_1$ interconnect line 42.

It should thus be appreciated that, in the illustrated example, MEMS accelerometer 20 employs a number of movable fingers (i.e., $M_1$ fingers 34 and $M_2$ fingers 36), which are interleaved in an alternating pattern and electrically segregated by embedded dielectric features, such as dielectric-filled trenches. As a result of this structural configuration, $M_1$ fingers 34 and $M_2$ fingers 36 are laterally mechanically joined by way of the isolation features in essentially the same plane (or, more accurately, fingers 34 and 36 are bound by upper and lower planes, which are substantially co-planar). $M_1$ and $M_2$ fingers 34 and 36 are electrically coupled by conductors (e.g., interconnect lines 54 and 60) formed above (or alternatively below) the structural layer 64 (FIG. 2) in which fingers 34 and 36 are formed. By interleaving $M_1$ and $M_2$ fingers 34 and 36 in addition to $X_1$ and $X_2$ fingers 30 and 32 in the above-described manner, the overall die size of accelerometer 20 is reduced with little to no impact on performance. For example, as compared to similar accelerometer design wherein the proof mass is divided into two separate electrode nodes and the $M_1$ and $M_2$ fingers are not interleaved, MEMS accelerometer 20 eliminates wasted area such that all or virtually all finger-to-finger gaps contribute to the sensing function. As a result, the minimum sense cell pitch, as identified in FIG. 3 by double headed arrow 94, may be significantly reduced; e.g., in an embodiment, the minimum sense cell pitch of accelerometer 20 may be about 9 µm or less or about 35% less than a comparable accelerometer having non-interleaved $M_1$ and $M_2$ fingers and a minimum sense cell pitch of about 15 µm. Stated differently, the lateral distance between the centerlines of the neighboring movable fingers is preferably less than about 9 µm in an embodiment.

Figure 5:
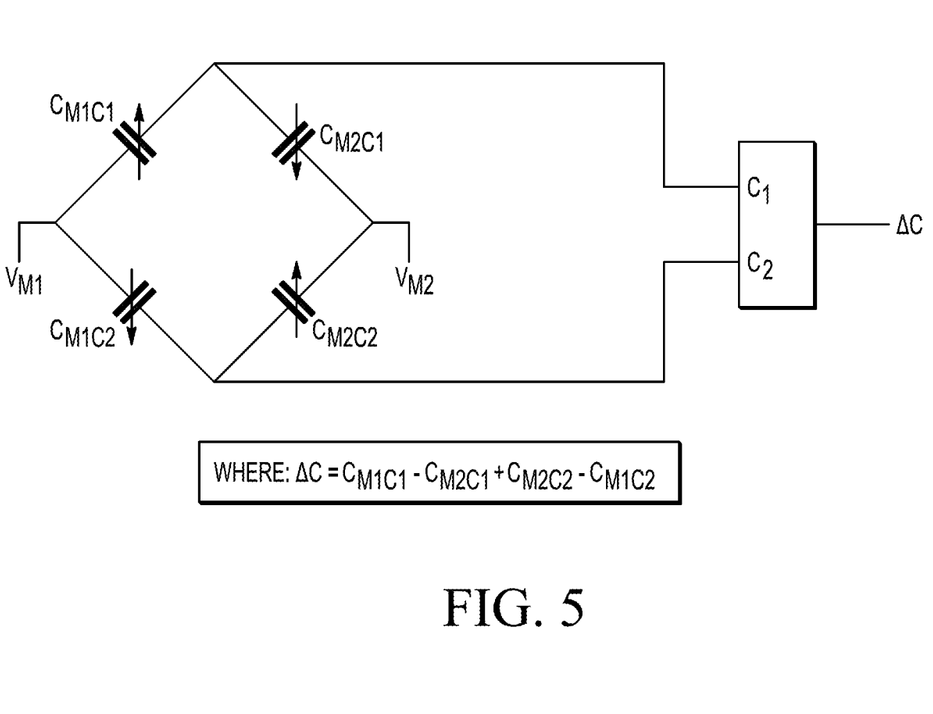
FIG. 5 is a circuit diagram of the exemplary MEMS device shown in FIGS. 1-4.

In addition to the above-described benefits in size reduction and in stress isolation, MEMS accelerometer 20 also provides exceptional performance characteristics due, at least in part, to its fully differential or wheatstone bridge topology. This may be further appreciated by referring to FIG. 5, which is a circuit diagram of MEMS accelerometer 20 wherein $V_{M1}$ is a first voltage applied to the $M_1$ fingers 34; $V_{M2}$ is a second voltage applied to the $M_2$ fingers 36; and $C_{M1C1}$, $C_{M2C1}$, $C_{M2C2}$, and $C_{M1C2}$ are the four capacitances across fingers 30, 32, 34, and 36 (specifically, first, second, third, and fourth capacitances across sense fingers 30 and 34, fingers 32 and 34, fingers 30 and 36, and fingers 32 and 36, respectively); and αC is the capacitive output of MEMS accelerometer 20. The change in capacitance output αC is then converted via electronics (not shown) into a signal having a parameter magnitude (e.g. voltage, current, frequency, etc.) that is dependent on acceleration of MEMS accelerometer 20. By virtue of its fully-differentiated, whole-bridge capacitive topology, MEMS accelerometer 20 is able to achieve improved signal gains and relatively high signal-to-noise ratios. MEMS accelerometer 20 thus includes a wheatstone bridge formed by fingers 30, 32, 34, and 36 and their associated interconnects.

The foregoing has provided embodiments of a MEMS accelerometer or other MEMS device. In one embodiment, the MEMS device includes a substrate, a movable structure resiliently coupled to the substrate, and an anchored structure fixedly coupled to the substrate. The movable structure includes a first plurality of movable fingers, and a second plurality of movable fingers electrically isolated from and interspersed with the first plurality of movable fingers. The anchored structure includes fixed fingers interspersed with first and second pluralities of movable fingers in a capacitor-forming relationship. First and second interconnects are electrically coupled to the first and second pluralities of movable fingers, respectively.

The foregoing has also provided a method for fabricating a microelectromechanical system device, such as a MEMS sensor or actuator. In one embodiment, the method includes the step of forming a movable structure resiliently coupled to a substrate and including a first plurality of movable fingers and a second plurality of movable fingers electrically isolated from and interspersed with the first plurality of movable fingers. An anchored structure is produced fixedly coupled to the substrate and including fixed fingers interspersed with first and second pluralities of movable fingers in a capacitor-forming relationship. The first and second pluralities of movable fingers are electrically interconnected.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A microelectromechanical system ("MEMS") device, comprising:
    a substrate;
    a movable structure resiliently coupled to the substrate, the movable structure comprising:
        a first plurality of movable fingers; and
        a second plurality of movable fingers electrically isolated from and interleaved with the first plurality of movable fingers to form a pattern of alternating first and second movable fingers in which a single one of the first movable fingers is positioned between a pair of the second movable fingers and a single one of the second movable fingers is positioned between a pair of the first movable fingers;
    an anchored structure fixedly coupled to the substrate and including fixed fingers interspersed with the first and the second plurality of movable fingers in a capacitor-forming relationship; and
    first and second interconnects electrically coupled to the first and the second plurality of movable fingers, respectively the second interconnect extending between the first interconnect and the first plurality of movable fingers; and a plurality of cross-over features electrically coupling the first interconnect to the first plurality of movable fingers, while electrically isolating the first interconnect and the first plurality of movable fingers from the second interconnect.

2. A MEMS device according to claim 1 wherein the fixed fingers comprise:
    a first plurality of fixed fingers; and
    a second plurality of fixed fingers electrically isolated from and interspersed with the first plurality of fixed fingers, the first and the second plurality of fixed fingers distributed amongst the first and the second plurality of movable fingers in a laterally-spaced arrangement.

3. A MEMS device according to claim 2 wherein the first plurality of fixed fingers is electrically isolated from and interspersed with the second plurality of fixed fingers.

4. A MEMS device according to claim 2 further comprising:
    a third interconnect electrically coupled to the first plurality of fixed fingers; and a fourth interconnect electrically coupled to the second plurality of fixed fingers, the first, second, third, and fourth interconnects enabling monitoring of a first capacitance between the first plurality of fixed fingers and the first plurality of movable fingers, a second capacitance between the first plurality of fixed fingers and the second plurality of movable fingers, a third capacitance between the second plurality of fixed fingers and the first plurality of movable fingers, and a fourth capacitance between the second plurality of fixed fingers and the second plurality of movable fingers.

5. A MEMS device according to claim 4 wherein MEMS device comprises a wheatstone bridge formed, at least in part, by the first and the second plurality of movable fingers, the first and the second plurality of fixed fingers, and the first, second, third, and fourth interconnects.

6. A MEMS device according to claim 1 wherein the movable structure further comprises a plurality of electrical isolation features, each electrical isolation feature formed between a different neighboring pair of movable fingers.

7. A MEMS device according to claim 6 wherein the movable structure comprises an electrically-conductive body, and wherein the plurality of electrical isolation features comprise embedded electrical isolation features located between the electrically-conductive body of the movable structure.

8. A MEMS device according to claim 7 wherein the embedded electrical isolation features divide the electrically-conductive body of the movable structure into a plurality of electrically-isolated sections from each of which a different movable finger extends.

9. A MEMS device according to claim 7 wherein the embedded electrical isolation features mechanically join the first and the second plurality of movable fingers along a single plane.

10. A MEMS device according to claim 1 wherein a lateral distance between the centerlines of neighboring movable fingers is 9 microns or less.

11. A MEMS device according to claim 1 wherein the anchored structure comprises an elongated bridge, wherein the movable structure comprises a generally rectangular frame circumscribing the elongated bridge, and wherein the first and the second plurality of movable fingers extending inwardly from the generally rectangular frame toward the elongated bridge.

12. A microelectromechanical system ("MEMS") device, comprising:
    a substrate;
    a movable structure formed over the substrate, the movable structure comprising:
        a body resiliently coupled to the substrate;
        a first plurality of movable fingers extending from the body; and
        a second plurality of movable fingers extending from the body and interleaved with the first plurality of movable fingers to form a pattern of alternating first and second movable fingers in which a single one of the first movable fingers is positioned between a pair of the second movable fingers and a single one of the second movable fingers is positioned between a pair of the first movable fingers;

an anchored structure fixedly coupled to the substrate and including fixed fingers interspersed with the first and the second plurality of movable fingers in a capacitor-forming relationship; and first and second interconnects electrically coupled to the first and the second plurality of movable fingers, respectively the second interconnect extending between the first interconnect and the first plurality of movable fingers; and a plurality of cross-over features electrically coupling the first interconnect to the first plurality of movable fingers, while electrically isolating the first interconnect and the first plurality of movable fingers from the second interconnect.

13. A MEMS device according to claim 12 wherein the plurality of embedded electrical isolation features comprise a plurality of dielectric-filled trenches formed through the body of the movable structure.

14. A MEMS device according to claim 13 wherein the first and the second plurality of movable fingers are laterally mechanically joined by the plurality of dielectric-filled trenches.

15. A MEMS device according to claim 12 further comprising:

a first interconnect line formed over the body and electrically interconnecting the first plurality of movable fingers; and a second interconnect line formed over the body and electrically interconnecting the second plurality of movable fingers.

16. A MEMS device according to claim 15 further comprising:

a first dielectric layer formed between the first interconnect line and the body; and a second dielectric layer formed between the second interconnect line and the body.

17. A MEMS device according to claim 15 wherein the MEMS device comprises:

a structural layer in which the movable structure and the anchored structure are formed; and an interconnect layer formed over the structure layer and containing the first and second interconnect lines.

* * * * *